US008922582B2

(12) United States Patent
Murrett et al.

(10) Patent No.: US 8,922,582 B2
(45) Date of Patent: Dec. 30, 2014

(54) TEXT RENDERING AND DISPLAY USING COMPOSITE BITMAP IMAGES (76) Inventors: Martin J. Murrett, Portland, OR (US); Kevin R. G. Smyth, Vancouver (CA)

(*) Notice: Subject to any disclaimer, the term of this patent is extended or adjusted under 35 U.S.C. 154(b) by 1153 days.

(21) Appl. No.: 12/619,508

(22) Filed: Nov. 16, 2009

(65) Prior Publication Data

US 2011/0115796 A1 May 19, 2011

(51) Int. Cl.
G09G 5/00 (2006.01)
G06T 11/60 (2006.01)

(52) U.S. Cl.
CPC ................................ *G06T 11/60* (2013.01)
USPC .......................................... 345/619; 715/243

(58) Field of Classification Search
USPC ............................................ 345/619; 715/243
See application file for complete search history.

(56) References Cited

U.S. PATENT DOCUMENTS

| | | | |
|---|---|---|---|
| 5,335,290 A | | 8/1994 | Cullen |
| 5,517,586 A * | | 5/1996 | Knowlton .................. 382/292 |
| 5,588,072 A | | 12/1996 | Wang |
| 5,729,637 A * | | 3/1998 | Nicholson et al. ........... 382/282 |
| 5,893,127 A * | | 4/1999 | Tyan et al. .................... 715/209 |
| 5,991,515 A * | | 11/1999 | Fall et al. .................... 358/1.15 |
| 6,023,714 A * | | 2/2000 | Hill et al. .................... 715/235 |
| 6,073,148 A * | | 6/2000 | Rowe et al. ................... 715/205 |
| 6,289,122 B1 | | 9/2001 | Karidi |
| 6,385,350 B1 * | | 5/2002 | Nicholson et al. ............. 382/309 |
| 6,539,117 B2 | | 3/2003 | Carau, Sr. |
| 6,640,010 B2 * | | 10/2003 | Seeger et al. .................. 382/229 |
| 6,661,919 B2 * | | 12/2003 | Nicholson et al. ............ 382/173 |
| 6,665,841 B1 * | | 12/2003 | Mahoney et al. .............. 715/204 |
| 6,857,102 B1 * | | 2/2005 | Bickmore et al. ............. 715/205 |
| 7,013,309 B2 * | | 3/2006 | Chakraborty et al. .................. 1/1 |
| 7,278,117 B2 * | | 10/2007 | Gargi ........................... 715/864 |
| 7,593,961 B2 * | | 9/2009 | Eguchi et al. ........................ 1/1 |
| 7,844,889 B2 * | | 11/2010 | Rohrabaugh et al. .......... 715/200 |
| 2002/0029232 A1 * | | 3/2002 | Bobrow et al. ................ 707/517 |
| 2002/0067859 A1 * | | 6/2002 | Nicholson et al. ............. 382/229 |
| 2002/0091738 A1 * | | 7/2002 | Rohrabaugh et al. ......... 707/517 |
| 2003/0072490 A1 * | | 4/2003 | Pettersson et al. ............. 382/186 |
| 2004/0004641 A1 * | | 1/2004 | Gargi ........................... 345/848 |
| 2005/0132286 A1 * | | 6/2005 | Rohrabaugh et al. .......... 715/523 |
| 2005/0229111 A1 * | | 10/2005 | Makela ......................... 715/802 |
| 2007/0127771 A1 * | | 6/2007 | Kaneda et al. ................. 382/100 |
| 2007/0216687 A1 * | | 9/2007 | Kaasila et al. ................. 345/441 |
| 2009/0303550 A1 * | | 12/2009 | Hirabayashi .................. 358/448 |
| 2010/0174980 A1 * | | 7/2010 | Mansfield et al. ............. 715/234 |
| 2010/0174983 A1 * | | 7/2010 | Levy et al. .................... 715/243 |
| 2010/0174985 A1 * | | 7/2010 | Levy et al. .................... 715/244 |
| 2010/0275152 A1 * | | 10/2010 | Atkins et al. .................. 715/788 |

* cited by examiner

*Primary Examiner* — M Good Johnson
(74) *Attorney, Agent, or Firm* — Womble Carlyle Sandridge & Rice, LLP (57) ABSTRACT Some embodiments provide a system for displaying text on a display screen. During operation, the system obtains the text as a composite bitmap image along with a set of word positions associated with words in the composite bitmap image. Next, the system divides the composite bitmap image into a set of individual bitmap images based on the word positions and layout information associated with the text. Finally, the system displays the individual bitmap images on the display screen using the layout information.

25 Claims, 6 Drawing Sheets

TEXT RENDERING AND DISPLAY USING COMPOSITE BITMAP IMAGES

BACKGROUND

1. Field

The present embodiments relate to techniques for rendering and displaying text on a computer system. More specifically, the present embodiments relate to techniques for rendering and displaying text using composite bitmap images.

2. Related Art

Despite the increased use of digital media such as images, audio, and video in computer systems, human-computer interactions still rely on text. For example, a user of a computer system may rely on text to identify files and applications, access and read webpages, read and write emails and/or documents, and/or configure settings on the computer system. Consequently, human-computer interaction may be facilitated by improving the readability of text on computer displays such as liquid crystal displays (LCDs), cathode ray tube (CRT) displays, and/or display screens on portable electronic devices.

Modern computer systems typically render and display text by converting the text from an internal representation into a bitmap description. Such conversion may allow the text to be scaled to an arbitrary size prior to displaying the text on a display screen. In addition, readability and/or rendering accuracy across different display types and resolutions may be enhanced by applying advanced text rendering techniques such as anti-aliasing, hinting, and/or sub-pixel rendering to the bitmap description.

However, text rendered using advanced text rendering techniques may require additional computation, resulting in a tradeoff between rendering accuracy and rendering efficiency. Reduced efficiency from increased rendering accuracy may further affect the usability of computer systems with limited computational resources. For example, a portable electronic device with limited processor resources may hang and/or become unresponsive during sub-pixel rendering of text. Similarly, a web browser that displays remotely rendered text in a webpage may experience increased latency during re-rendering of the text (e.g., from resizing of the webpage).

Hence, what is needed is a mechanism for reducing computational costs associated with rendering and displaying text in computing systems.

SUMMARY

Some embodiments provide a system for displaying text on a display screen. During operation, the system obtains the text as a composite bitmap image along with a set of word positions associated with words in the composite bitmap image. Next, the system divides the composite bitmap image into a set of individual bitmap images based on the word positions and layout information associated with the text. Finally, the system displays the individual bitmap images on the display screen using the layout information.

In some embodiments, dividing the composite bitmap image into the set of individual bitmap images involves:
  (i) determining a set of continuous text regions on the display screen using the layout information; and
  (ii) forming the individual bitmap images using the word positions to fit the words into the continuous text regions.

In some embodiments, each of the continuous text regions contains one or more individual bitmap images.

In some embodiments, each of the individual bitmap images contains one or more words.

In some embodiments, each of the individual bitmap images contains one word, and the individual bitmap images are fit into the continuous text regions using variable-length spacing.

In some embodiments, the composite bitmap image corresponds to a wide line of text.

In some embodiments, the layout information includes at least one of alignment information, margin information, and shape information.

In some embodiments, the text is displayed within at least one of a web browser and a portable electronic device.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for rendering and displaying text. The text may be rendered and displayed using a client-server architecture. For example, a server may render the text remotely and provide the text for display on a web browser of a client. Alternatively, the text may be rendered and displayed within the same computing system, such as a personal computer, laptop computer, mobile phone, personal digital assistant (PDA), portable media player, and/or other electronic computing device with a display screen.

More specifically, the disclosed embodiments provide a method and system for rendering and displaying text using composite bitmap images. Each composite bitmap image may correspond to a wide line of text and/or a paragraph of text. As a result, each composite bitmap image may contain a set of words in the text. Furthermore, a set of word positions associated with words in the composite bitmap image may be used to locate the words in the composite bitmap image. To display the text, the composite bitmap image is divided into a set of individual bitmap images based on the word positions and layout information associated with the text. The layout information may include alignment information, margin information, and/or shape information.

In one or more embodiments, the composite bitmap image is divided into the individual bitmap images by determining a set of continuous text regions on the display screen using the layout information, and forming the individual bitmap images using the word positions to fit the words into the continuous text regions. The individual bitmap images may then be displayed within the continuous text regions on the display screen using the layout information. Furthermore, the text may be re-displayed without re-rendering by recreating the individual bitmap images and rearranging the individual bitmap images within the display screen. For example, changes to the text width on the display screen may be processed by recreating individual bitmap images that conform to the new text width and positioning the individual bitmap images within the text area on the display screen. In other words, the embodiments may reduce computational costs associated with rendering text by reusing rendered text in multiple layout configurations instead of re-rendering the text.

Figure 1:
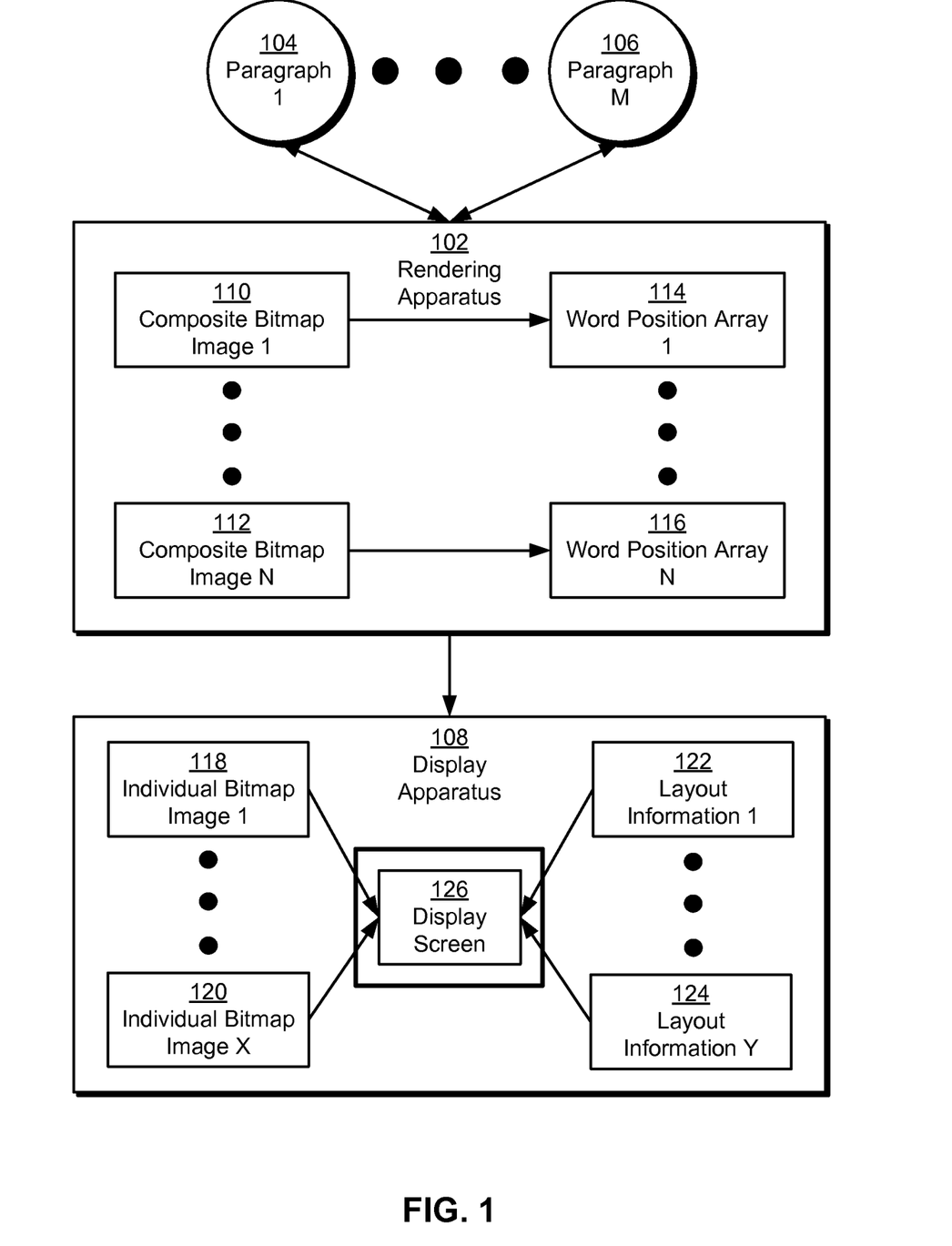
FIG. 1 shows a schematic of a system in accordance with an embodiment.

FIG. 1 shows a schematic of a system in accordance with an embodiment. The system may be used to render and display text on a display screen 126 (e.g., liquid crystal display (LCD), cathode ray tube (CRT) display, etc.) of an electronic computing device (e.g., personal computer, laptop computer, mobile phone, personal digital assistant (PDA), portable media player, etc.). For example, the system may be used to render and display text for a word processing application, web browser, email client, and/or other application that utilizes display screen 126. As shown in FIG. 1, the system includes a rendering apparatus 102 and a display apparatus 108.

In one or more embodiments, the system of FIG. 1 reduces computational overhead associated with rendering and displaying text in the electronic computing device. In particular, rendering apparatus 102 may obtain one or more paragraphs (e.g., paragraph 1 104, paragraph m 106) of text and format each paragraph into one or more wide lines of text. For example, rendering apparatus 102 may format each paragraph into one wide line of text, regardless of the length of the paragraph. Alternatively, rendering apparatus 102 may format each paragraph into one or more wide lines of fixed length (e.g., 2000 pixels).

Rendering apparatus 102 may then render each wide line as a composite bitmap image (e.g., composite bitmap image 1 110, composite bitmap image n 112). In other words, each composite bitmap image may contain a set of words from a paragraph of text that is rendered using one or more fonts in one or more sizes. For example, rendering apparatus 102 may render a paragraph of Unicode text into a composite bitmap image containing characters from the Helvetica font at a 10-point size. Rendering apparatus 102 may also apply anti-aliasing, hinting, sub-pixel rendering, and/or other advanced text rendering techniques during rendering to improve the accuracy, readability, and/or clarity of characters in the composite bitmap image.

Rendering apparatus 102 may also determine a set of word positions associated with the words in the composite bitmap image and store the word positions in a word position array (e.g., word position array 1 114, word position array n 116). As discussed below with respect to FIG. 3A, the word positions may correspond to pixel widths and/or pixel ranges of the words in the composite bitmap image and may allow the words to be located within the composite bitmap image.

To display the rendered text, display apparatus 108 may obtain the composite bitmap image(s) and corresponding word position array(s) associated with the text and divide the composite bitmap image(s) into a set of individual bitmap images (e.g., individual bitmap image 1 118, individual bitmap image x 120) based on the word positions and layout information (e.g., layout information 1 122, layout information y 124) associated with the text. In particular, display apparatus 108 may create the individual bitmap images such that each individual bitmap image may contain a subset of words from a composite bitmap image. As a result, the individual bitmap images may be created from the composite bitmap image(s) to accommodate multiple layout configurations of text on display screen 126.

In one or more embodiments, layout information associated with the text specifies the layout configuration of the text on display screen 126. The layout information may include alignment information, margin information, and/or shape information. For example, the layout information may specify the width, alignment, and positioning of text within a word-processing document, as well as the placement, dimensions, and/or sizes of shapes (e.g., embedded images) around which the text must wrap.

Using the layout information, display apparatus 108 may determine a set of continuous text regions on display screen 126 and form the individual bitmap images using the word positions to fit the words into the continuous text regions. Display apparatus 108 may then display the individual bitmap images on display screen 126 using the layout information for the text. Display of text within continuous text regions is discussed in further detail below with respect to FIG. 3B.

In one or more embodiments, each continuous text region contains one or more individual bitmap images, and each individual bitmap image contains one or more words. Furthermore, the size and content of each individual bitmap image may be based on the layout information associated with the text. For example, if the layout information specified fixed-length spacing between words, each individual bitmap image may contain a subset of words from the text that fits into a continuous text region on display screen 126. However, if layout information for the text specified variable-length spacing between words (e.g., text justification), each individual bitmap image may contain one word, and the individual bitmap images may be arranged within the continuous text regions to align along margins and/or other borders (e.g., borders of shapes).

The composition and layout of the individual bitmap images on display screen 126 may also be based on the orientation of the language(s) in which the text is written and/or rendered. For example, composite bitmap images may contain text in a left-to-right orientation (e.g., English text), a right-to-left orientation (e.g., Arabic text), and/or a vertical orientation (e.g., Chinese text). Individual bitmap images may then be created from composite bitmap images based on the orientation of the text. For example, individual bitmap images containing vertical text may be created to fit within the top and bottom margins of a webpage.

Those skilled in the art will appreciate that the functionality of rendering apparatus 102 and/or display apparatus 108 may be implemented in a variety of ways. As described below with respect to FIGS. 2A-2B, the system of FIG. 1 may be implemented using a client-server architecture and/or within a portable electronic device. Moreover, rendering apparatus 102 and/or display apparatus 108 may be implemented using one or more hardware modules (e.g., integrated circuits) and/or using software that executes on a processor. Consequently, the rendering and display of text on display screen 126 may be performed by different combinations of hardware and/or software components on one or more electronic computing devices.

Figure 2A:
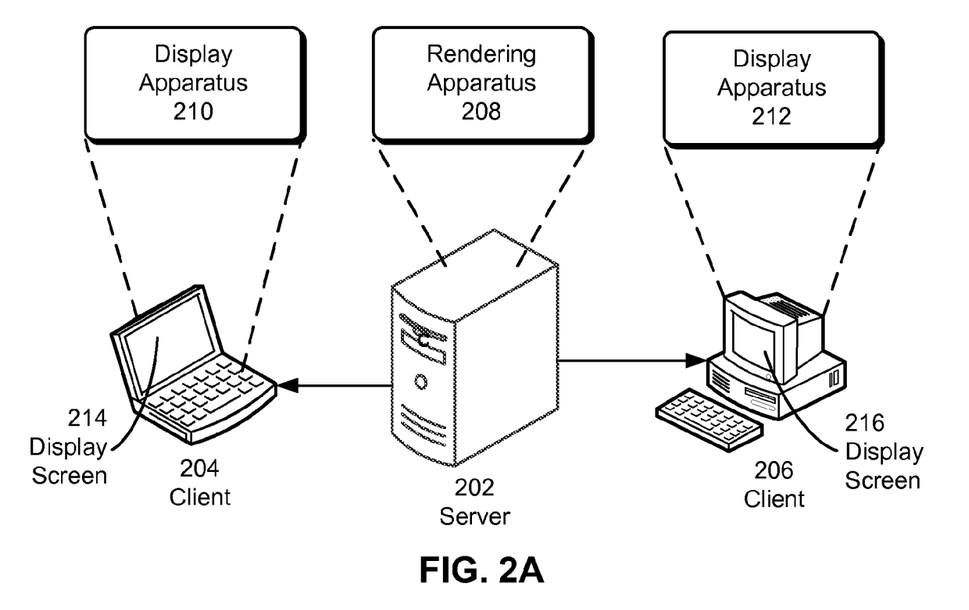
FIG. 2A shows a client-server architecture for rendering and displaying text in accordance with an embodiment.

FIG. 2A shows a client-server architecture for rendering and displaying text in accordance with an embodiment. As shown in FIG. 2A, a server 202 is configured to communicate with two clients 204-206. Server 202 includes a rendering apparatus 208 (e.g., rendering apparatus 102 of FIG. 1), and clients 204-206 each include a display apparatus 210-212 (e.g., display apparatus 108 of FIG. 1). In one or more embodiments, server 202 uses rendering apparatus 208 to render text remotely for clients 204-206. Display apparatuses 210-212 may obtain the rendered text from server 202 and display the text on display screens 214-216 of clients 204-206.

In one or more embodiments, clients 204-206 interact with server 202 through a web-based interface. For example, clients 204-206 may obtain one or more webpages and/or web applications from server 202 using a web browser and network connection. Furthermore, text associated with the webpages and/or web applications may be rendered by the server as a set of composite bitmap images and word positions and sent to clients 204-206. Because display apparatuses 210-212 on clients 204-206 include functionality to rearrange words from the composite bitmap images in multiple layout configurations, the text may not require re-rendering if changes to the layout (e.g., text widths, margins, shapes, etc.) of text on display screens 214-216 are made. As a result, the client-server architecture of FIG. 2A may mitigate network bandwidth and/or latency issues associated with remote rendering of text by reducing the need to re-render the text.

Furthermore, the client-server architecture of FIG. 2A may allow additional fonts to be used in web browsers that do not typically support the fonts and/or cannot normally use the fonts because of licensing issues. For example, server 202 may include a number of fonts that are not available on clients 204-206. In addition, web browsers on clients 204-206 may be incapable of obtaining new fonts from server 202 for use in webpages, or the fonts may not be licensed for use on clients 204-206. However, server 202 may bypass such font rendering and/or licensing issues by rendering the fonts using rendering apparatus 208 and sending the rendered composite bitmap images and corresponding word positions to clients 204-206 for display within the web browsers. In other words, the architecture of FIG. 2A may allow a variety of fonts to be displayed across different web browsers, independently of the web browsers' abilities to render and/or otherwise use the fonts.

Figure 2B:
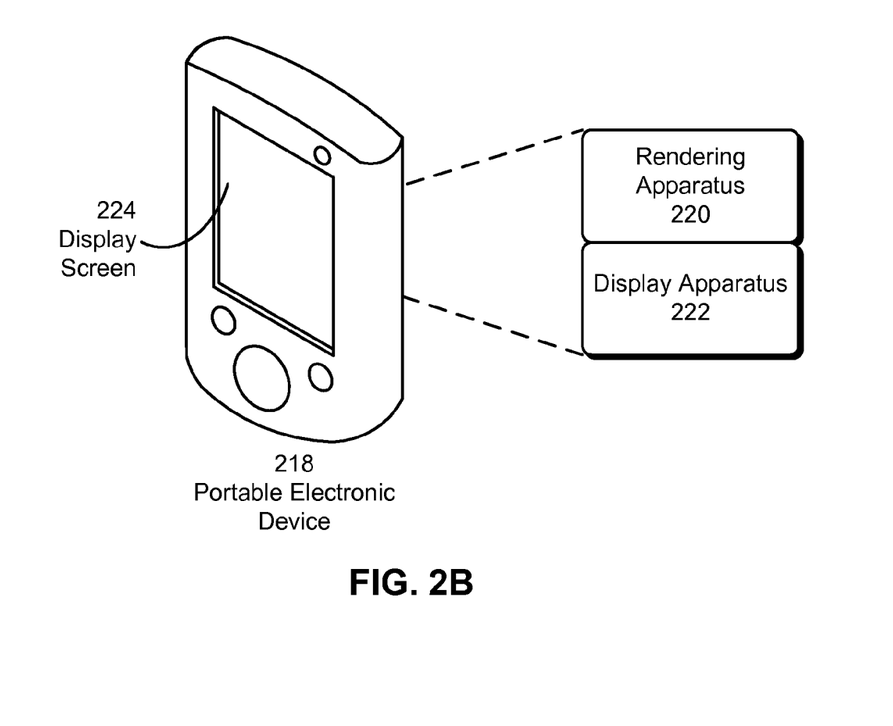
FIG. 2B shows a system for rendering and displaying text in a portable electronic device in accordance with an embodiment.

FIG. 2B shows a system for rendering and displaying text in a portable electronic device 218 in accordance with an embodiment. The portable electronic device may correspond to a mobile phone, portable media player, PDA, and/or other handheld, low-powered electronic device. Because portable electronic device 218 may have limited processing power, portable electronic device 218 may lack the computational resources to efficiently render text using techniques such as sub-pixel rendering, hinting, and/or anti-aliasing.

Instead, portable electronic device 218 may utilize a rendering apparatus 220 (e.g., rendering apparatus 102 of FIG. 1) and a display apparatus 222 (e.g., display apparatus 108 of FIG. 1) to efficiently render and display text on a native display screen 224. As described above, rendering apparatus 220 may render text as one or more composite bitmap images, which are then divided into individual bitmap images by display apparatus 222 and displayed on display screen 224 based on layout information associated with the text. Furthermore, the individual bitmap images may be recreated and rearranged to accommodate different layout configurations of text on display screen 224. As a result, rendering apparatus 220 and display apparatus 222 may reduce computational costs associated with rendering text on portable electronic device 218 by allowing rendered text to be reused in multiple layout configurations on display screen 224.

Figure 3A:
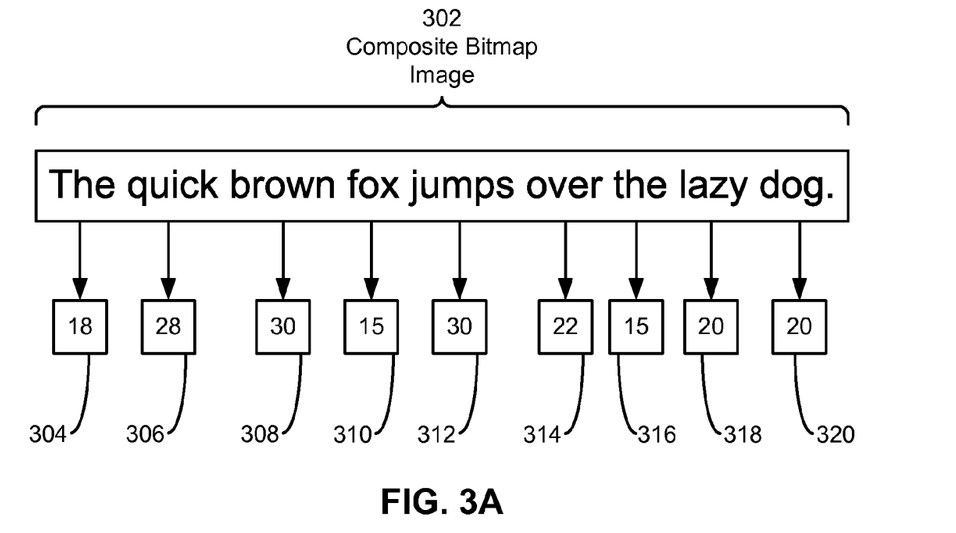
FIG. 3A shows an exemplary composite bitmap image and a set of word positions in accordance with an embodiment.

FIG. 3A shows an exemplary composite bitmap image 302 and a set of word positions 304-320 in accordance with an embodiment. As shown in FIG. 3A, composite bitmap image 302 contains a line of text (e.g., "The quick brown fox jumps over the lazy dog."). In addition, each of nine words in composite bitmap image 302 is associated with a word position 304-320. Word positions 304-320 may be stored in a word position array, linked list, map, and/or other data structure that maps to words in composite bitmap image 302.

In one or more embodiments, word positions 304-320 correspond to pixel widths of words in composite bitmap image 302. For example, word position 304 may specify that the first word (e.g., "The") in composite bitmap image 302 is 18 pixels wide, word position 306 may specify that the second word (e.g., "quick") is 28 pixels wide, word position 308 may specify that the third word (e.g., "brown") is 30 pixels wide, and word position 310 may specify that the fourth word (e.g., "fox") is 15 pixels wide. Alternatively, word positions 304-320 may contain values such as pixel ranges (e.g., "0-17," "18-35," etc.) instead of pixel widths. Regardless of the format of word positions 304-320, word positions 304-320 may be used to locate words within composite bitmap image 302.

In particular, the locations of the words may be used to divide composite bitmap image 302 into individual bitmap images for display on a display screen (e.g., display screen 126 of FIG. 1). As discussed above, the forming of individual bitmap images may be based on layout information associated with the text. For example, if the layout information specified a text width of 140 pixels, composite bitmap image 302 may be divided into two individual bitmap images, with the first individual bitmap image containing the first five words (e.g., "The quick brown fox jumps") at a width of 121 pixels and the second individual bitmap image containing the last four words (e.g., "over the lazy dog.") at a width of 77 pixels. To conform to the layout information, the first individual bitmap image may be displayed on one line of the display screen, and the second individual bitmap image may be displayed on the next line of the display screen.

Figure 3B:
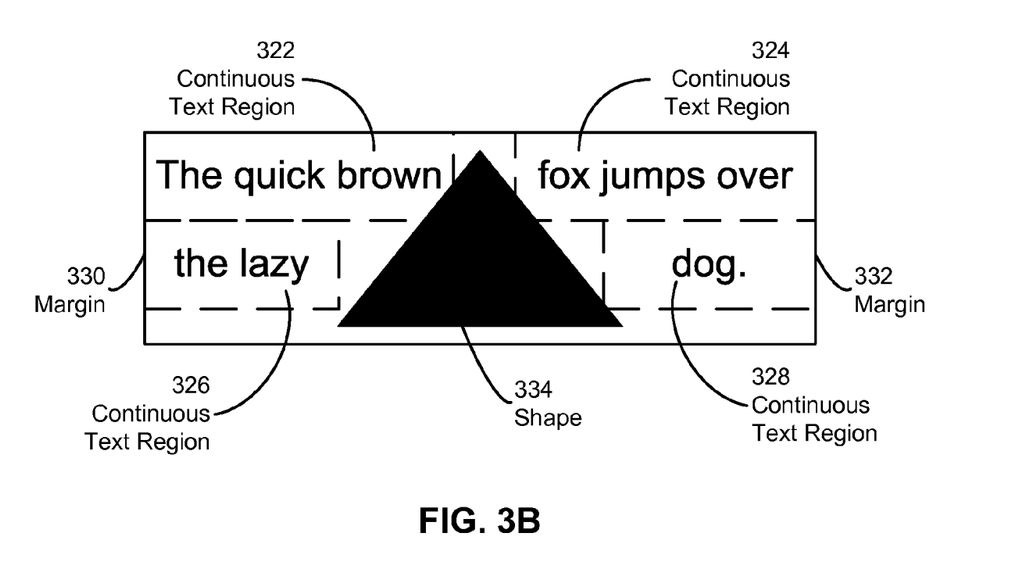
FIG. 3B shows an exemplary display of text in accordance with an embodiment.

FIG. 3B shows an exemplary display of text in accordance with an embodiment. More specifically, FIG. 3B shows the display of text from composite bitmap image 302 within a layout configuration. The layout configuration includes two margins 330-332 and a shape 334 around which the text may be configured to wrap.

As shown in FIG. 3B, margins 330-332 and shape 334 create four continuous text regions 322-328 within the layout configuration. Each continuous text region 322-328 may include space for a certain amount of text, depending on the length and size of the words in the text (e.g., as specified in word positions 304-320). Continuous text region 322 contains the first three words (e.g., "The quick brown") of composite bitmap image 302, continuous text region 324 contains the next three words (e.g., "fox jumps over"), continuous text region 326 contains the next two words (e.g., "the lazy"), and continuous text region 328 contains the last word (e.g., "dog.").

The arrangement of words from composite bitmap image 302 within continuous text regions 322-328 may be determined by sequentially fitting the maximum possible number of words from composite bitmap image 302 into each continuous text region 322-328 before proceeding to the next continuous text region. For example, continuous text region 322 may be sequentially filled with words starting from the first word (e.g., "The") of composite bitmap image 302 until continuous text region 322 lacks space for an additional word (e.g., "fox"). The process may then be repeated for continuous text region 324, then continuous text region 326, and finally continuous text region 328 such that continuous text regions 322-328 are filled with words from composite bitmap image 302.

On the other hand, words from composite bitmap image 302 may be fit into continuous text regions 322-328 according to other criteria. For example, the words may be divided more evenly among continuous text regions 322-328 for a more distributed layout of text between margins 330-332 and shape 334. Continuous text regions 322-328 may also be rotated, justified, and/or resized to achieve other effects associated with the layout of text around margins 330-332 and shape 334. Continuous text regions 322-328 may also accommodate languages with right-to-left and/or vertical orientations. For example, continuous text regions 322-328 may be formed based on vertical margins and boundaries of shape 334 instead of horizontal margins 330-332 to contain vertical text from an East Asian language.

As mentioned previously, each continuous text region 322-328 may contain one or more individual bitmap images, and each individual bitmap image may contain one or more words. For example, continuous text regions 322-328 may each contain one individual bitmap image. On the other hand, continuous text region 328 may also include a second individual bitmap image from another composite bitmap image if additional text is to be displayed after the end of text from composite bitmap image 302 (e.g., "dog."). Moreover, each word of composite bitmap image 302 may be placed into a separate individual bitmap image to enable the use of variable-length spacing, justification, and/or other more complex layout effects in the display of text.

Figure 4:
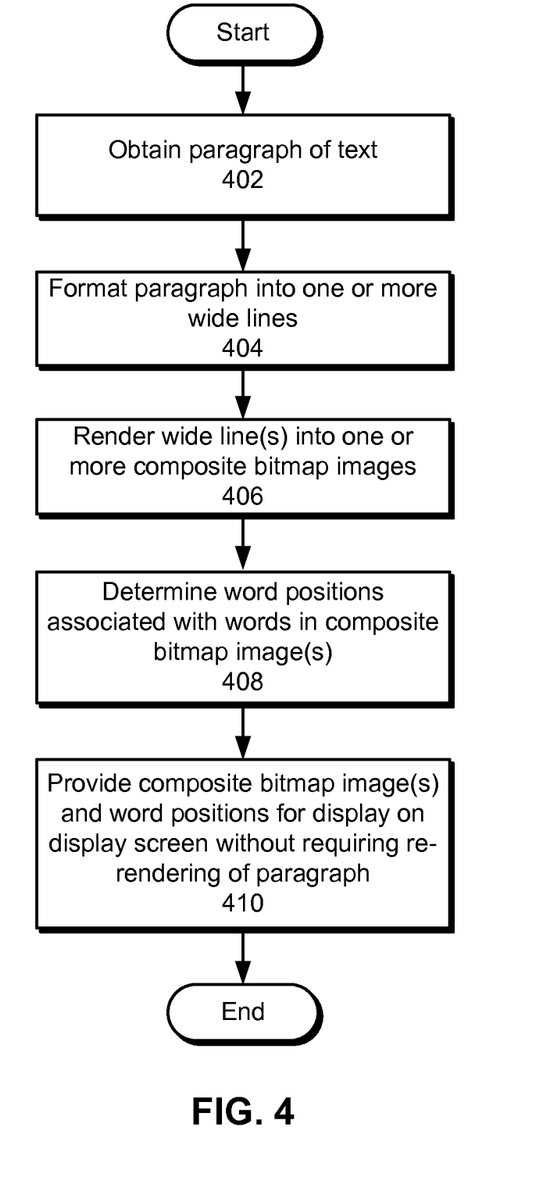
FIG. 4 shows a flowchart illustrating the process of rendering text in accordance with an embodiment.

FIG. 4 shows a flowchart illustrating the process of rendering text in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

First, a paragraph of text is obtained (operation 402) and formatted into one or more wide lines (operation 404). For example, the paragraph may be formatted into a single wide line of text, regardless of the paragraph's length, or the paragraph may be formatted into one or more wide lines of fixed length (e.g., 2000 pixels). Next, the wide line(s) are rendered into one or more composite bitmap images (operation 406). The composite bitmap images may contain characters in the paragraph to be displayed on a display screen and may be rendered using techniques such as anti-aliasing, hinting, and/or sub-pixel rendering.

Word positions associated with words in the composite bitmap image(s) are then determined (operation 408). The word positions may correspond to pixel widths, pixel ranges, and/or other data that allow the words to be located in the composite bitmap image(s). Finally, the composite bitmap image(s) and word positions are provided for display on a display screen without requiring re-rendering of the paragraph (operation 410). In other words, the word positions may facilitate the creation and arrangement of individual bitmap images from the composite bitmap image to accommodate multiple layout configurations on the display screen without requiring re-rendering of the paragraph.

Figure 5:
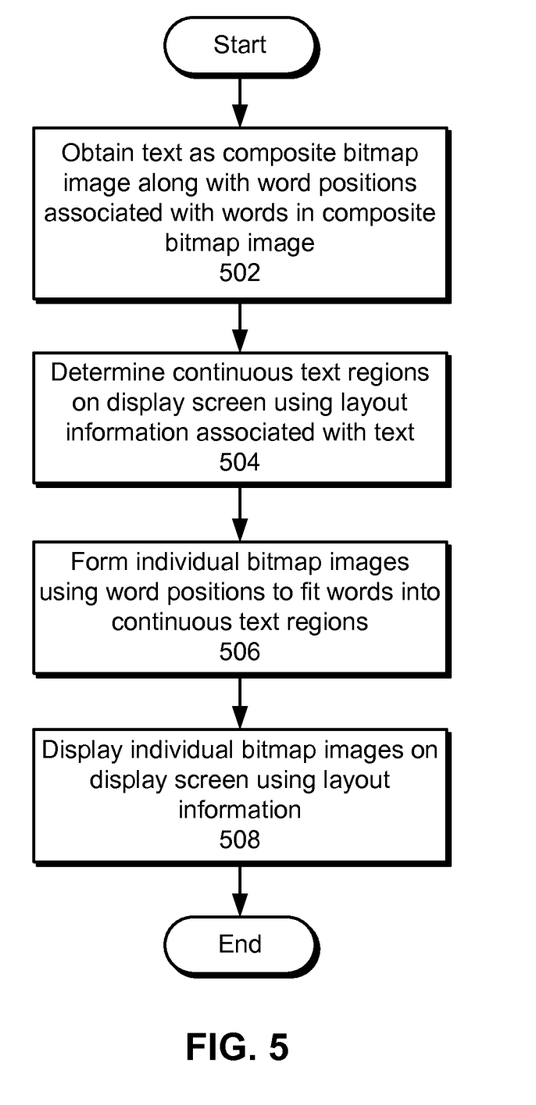
FIG. 5 shows a flowchart illustrating the process of displaying text on a display screen in accordance with an embodiment.

FIG. 5 shows a flowchart illustrating the process of displaying text on a display screen in accordance with an embodiment. In one or more embodiments, one or more of the steps may be omitted, repeated, and/or performed in a different order. Accordingly, the specific arrangement of steps shown in FIG. 5 should not be construed as limiting the scope of the embodiments.

Initially, the text is obtained as a composite bitmap image along with a set of word positions associated with words in the composite bitmap image (operation 502). The word positions may be stored in an array, linked list, map, and/or other data structure that maps the word positions to words in the composite bitmap image. In addition, the word positions may correspond to pixel widths, pixel ranges, and/or other data that allows the words to be located within the composite bitmap image.

To display the text in a specific format and/or layout configuration, the composite bitmap image may be divided into a set of individual bitmap images. To create the individual bitmap images, continuous text regions on the display screen are determined using layout information associated with the text (operation 504). The layout information may include alignment information, margin information, shape information, and/or other information specifying the arrangement of text on the display screen. For example, the layout information may specify a text width, margin width, justification, text distribution, embedded shapes, and/or other characteristics associated with the layout of text on the display screen. The continuous text regions may thus correspond to areas of the display screen that contain continuous sections of text within the layout configuration specified by the layout information.

Individual bitmap images are then formed using the word positions to fit the words into the continuous text regions (operation 506). For example, continuous text regions may be sequentially filled with individual bitmap images containing the maximum number of words that fit into each continuous text region until all words in the composite bitmap image are used in the individual bitmap images. Alternatively, each individual bitmap image may contain only one word for additional flexibility in arranging, spacing, and/or laying out text within the continuous text regions.

Finally, the individual bitmap images are displayed on the display screen using the layout information (operation 508). For example, the individual bitmap images may be displayed to align with certain margins or shapes specified in the layout information. The individual bitmap images may also be recreated from the composite bitmap image and/or rearranged on the display screen to accommodate changes to the layout information (e.g., different layout configurations). For example, text from the composite bitmap image may be shifted across different line boundaries (e.g., continuous text regions) if the margin widths are changed and/or additional text is added to the display screen. To display the shifted text, the individual bitmap images may be reformed across the new line boundaries and rearranged on the display screen. As a result, words in the composite bitmap image may not require re-rendering unless changes are made directly to the words.

Figure 6:
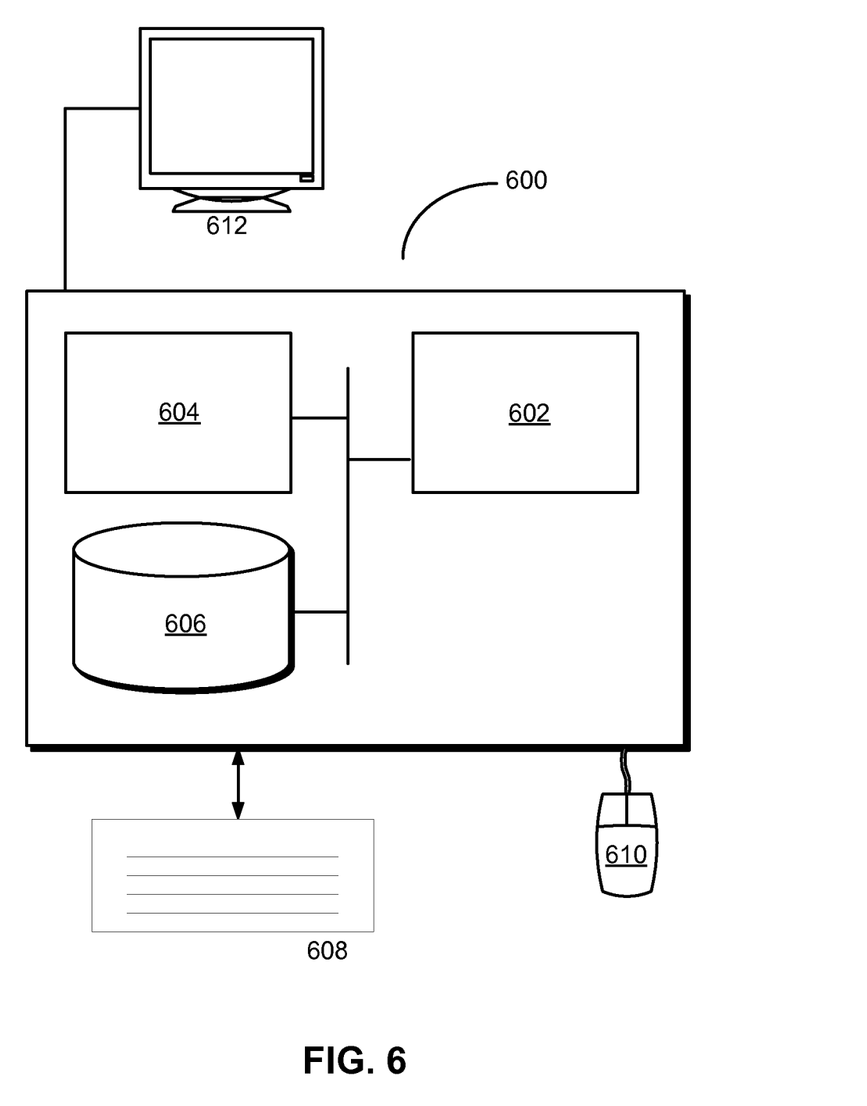
FIG. 6 shows a computer system in accordance with an embodiment.

FIG. 6 shows a computer system in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for rendering and displaying text on a display screen (e.g., display 612). The system may include a rendering apparatus that formats paragraphs of text into one or more wide lines, renders the wide lines into one or more composite bitmap images, and determines a set of word positions associated with words in the composite bitmap image(s). The system may also include a display apparatus that divides the composite bitmap image(s) into a set of individual bitmap images based on the word positions and layout information associated with the text, and displays the individual bitmap images on the display screen using the layout information.

In addition, one or more components of computer system 600 may be remotely located and connected to the other components over a network. Portions of the present embodiments (e.g., rendering apparatus, display apparatus, etc.) may also be located on different nodes of a distributed system that implements the embodiments. For example, the present embodiments may be implemented using a cloud computing system that renders text into composite bitmap images and sends the composite bitmap images to one or more clients for display within a web browser.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for displaying text on a display screen, comprising:
at a client device:
receiving, from a server, a composite bitmap image, wherein the composite bitmap image includes a plurality of individual words and text is rendered into the composite bitmap image at the server;
receiving, from the server, word position information that identifies, for each individual word included in the plurality of individual words, a location of the individual word within the composite bitmap image;
analyzing layout information associated with the client device to identify a set of continuous text regions for displaying the text on the display screen of the client device, wherein the layout information comprises a first layout configuration of the text;
for each continuous text region of the set of continuous text regions:
creating an individual bitmap image that includes at least one individual word of the plurality of individual words included in the composite bitmap image based on the word position information, wherein the individual bitmap image includes a maximum number of individual words capable of fitting within the continuous text region;
displaying each individual bitmap image within the corresponding continuous text region on the display screen based on the first layout configuration of the text; and
in response to a change from the first layout configuration of the text to a second layout configuration of the text, re-displaying each individual bitmap image within the corresponding continuous text region on the display screen based on the second layout configuration of the text without re-rendering the text at the server.

2. The computer-implemented method of claim 1, wherein the set of continuous text regions are identified by analyzing both margins and borders of shapes that define areas where the text is not displayed on the client device.

3. The computer-implemented method of claim 1, wherein each individual bitmap image is fit into the corresponding continuous text region using variable-length spacing.

4. The computer-implemented method of claim 1, wherein the composite bitmap image corresponds to a wide line representation of a paragraph of the text.

5. The computer-implemented method of claim 1, wherein the layout information includes at least one of alignment information, margin information, and shape information.

6. The computer-implemented method of claim 1, wherein the text is displayed within a web browser executing on the client device.

7. The computer-implemented method of claim 1, wherein re-displaying each individual bitmap image further comprises re-creating each individual bitmap image from the composite bitmap image and re-arranging each individual bitmap image within the corresponding continuous text region on the display screen based on the second layout configuration of the text.

8. A computer-implemented method for rendering text, comprising:
at a server:
obtaining a paragraph of text;
formatting the paragraph of text into one or more wide lines of text;
for each wide line of the one or more wide lines:
rendering the wide line into a composite bitmap image, and determining a set of word positions associated with one or more individual words included in the composite bitmap image; and providing, to a client device, the composite bitmap images and the associated set of word positions, wherein the composite bitmap images and the set of word positions are utilized by the client device when the client device displays the paragraph of text on a display screen of the client device, and the set of word positions enable creation of a set of individual bitmap images from each of the composite bitmap images to accommodate a plurality of layout configurations on the display screen without requiring re-rendering of the paragraph of text at the server.

9. The computer-implemented method of claim 8, wherein the set of word positions are defined as pixel widths or pixel ranges that locate the one or more individual words within the associated composite bitmap image.

10. The computer-implemented method of claim 8, wherein the paragraph of text is displayed on the display screen by:
   dividing each of the composite bitmap images into the set of individual bitmap images based on both the set of word positions and layout information associated with the client device; and
   displaying the set of individual bitmap images on the display screen according to the layout information.

11. The computer-implemented method of claim 10, wherein the layout information is at least one of alignment information, margin information, and shape information.

12. A system for displaying text on a display screen of a client device, comprising:
   a server that includes a rendering apparatus, wherein the rendering apparatus is configured to:
      obtain a paragraph of text;
      format the paragraph of text into one or more wide lines of text;
      for each wide line of the one or more wide lines:
         render the wide line into a composite bitmap image, and
         determine a set of word positions associated with one or more individual words included in the composite bitmap image; and
      transmit, to a client device, both the set of word positions and the one or more composite bitmap images; and
   the client device, wherein the client device is configured to:
   receive, from the server, at least one composite bitmap image of the one or more composite bitmap images, wherein the at least one composite bitmap image includes the one or more individual words;
   receive, from the server, word position information comprising the set of word positions, wherein the word position information identifies, for each individual word included in the one or more individual words, a location of the individual word within the at least one composite bitmap image;
   analyze layout information associated with the client device to identify a set of continuous text regions for displaying the paragraph of text on the client device, wherein the layout information comprises a first layout configuration of the paragraph of text;
   for each continuous text region of the set of continuous text regions:
      create an individual bitmap image that includes at least one individual word of the one or more individual words included in the at least one composite bitmap image based on the word position information, wherein the individual bitmap image includes a maximum number of individual words capable of fitting within the continuous text region;
   display each individual bitmap image within the corresponding continuous text region on the display screen based on the first layout configuration of the paragraph of text; and
   in response to a change from the first layout configuration of the paragraph of text to a second layout configuration of the paragraph of text, re-display each individual bitmap image within the corresponding continuous text region on the display screen based on the second layout configuration of the paragraph of text without re-rendering the paragraph of text at the server.

13. The system of claim 12, wherein the set of continuous text regions are identified by analyzing both margins and borders of shapes that define areas where the paragraph of text is not displayed on the client device.

14. The system of claim 12, wherein each individual bitmap image is fit into the corresponding continuous text region using variable-length spacing.

15. The system of claim 12, wherein the layout information includes at least one of alignment information, margin information, and shape information.

16. The system of claim 12, wherein the client device is a portable electronic device.

17. The system of claim 12, wherein the client device is configured to re-display each individual bitmap image by re-creating each individual bitmap image from the at least one composite bitmap image and re-arranging each individual bitmap image within the corresponding continuous text region on the display screen based on the second layout configuration of the paragraph of text.

18. A non-transitory computer-readable storage medium storing instructions that, when executed by a processor, cause the processor to perform a method for displaying text on a display screen of a client device, the method comprising:
   receiving, from a server, a composite bitmap image, wherein the composite bitmap image includes a plurality of individual words and text is rendered into the composite bitmap image at the server;
   receiving, from the server, word position information that identifies, for each individual word included in the plurality of individual words, a location of the individual word within the composite bitmap image;
   analyzing layout information associated with the client device to identify a set of continuous text regions for displaying the text on the display screen of the client device, wherein the layout information comprises a first layout configuration of the text;
   for each continuous text region of the set of continuous text regions:
      creating an individual bitmap image that includes at least one individual word of the plurality of individual words included in the composite bitmap image based on the word position information, wherein the individual bitmap image includes a maximum number of individual words capable of fitting within the continuous text region;
   displaying each individual bitmap image within the corresponding continuous text region on the display screen based on the first layout configuration of the text; and
   in response to a change from the first layout configuration of the text to a second layout configuration of the text, re-displaying each individual bitmap image within the corresponding continuous text region on the display screen based on the second layout configuration of the text without re-rendering the text at the server.

19. The non-transitory computer-readable storage medium of claim 18, wherein the set of continuous text regions are identified by analyzing both margins and borders of shapes that define areas where the text is not displayed on the client device.

20. The non-transitory computer-readable storage medium of claim 18, wherein the layout information includes at least one of alignment information, margin information, and shape information.

21. The non-transitory computer-readable storage medium of claim 18, wherein the text is displayed within a web browser executing on the client device.

22. The non-transitory computer-readable storage medium of claim 18, wherein each individual bitmap is fit into the corresponding continuous text region using variable-length spacing.

23. The non-transitory computer-readable storage medium of claim 18, wherein the composite bitmap image corresponds to a wide line representation of a paragraph of the text.

24. The non-transitory computer-readable storage medium of claim 18, wherein the client device is a portable electronic device.

25. The non-transitory computer-readable storage medium of claim 18, wherein re-displaying each individual bitmap image further comprises re-creating each individual bitmap image from the composite bitmap image and re-arranging each individual bitmap image within the corresponding continuous text region on the display screen based on the second layout configuration of the text.

* * * * *

UNITED STATES PATENT AND TRADEMARK OFFICE
CERTIFICATE OF CORRECTION

| | |
|---|---|
| PATENT NO. | : 8,922,582 B2 |
| APPLICATION NO. | : 12/619508 |
| DATED | : December 30, 2014 |
| INVENTOR(S) | : Martin J. Murrett et al. |

Page 1 of 1

It is certified that error appears in the above-identified patent and that said Letters Patent is hereby corrected as shown below:

In the Claims:

Column 11, line 5 (Claim 8, line 14): "the associated set" should read --the set--.

Column 11, line 44 (Claim 12, line 14): "a client device" should read --the client device--.

Signed and Sealed this
Fifth Day of May, 2015

Michelle K. Lee
*Director of the United States Patent and Trademark Office*